AIR FILTERING APPARATUS
Original Filed June 26, 1967 
*Fig. 1.*
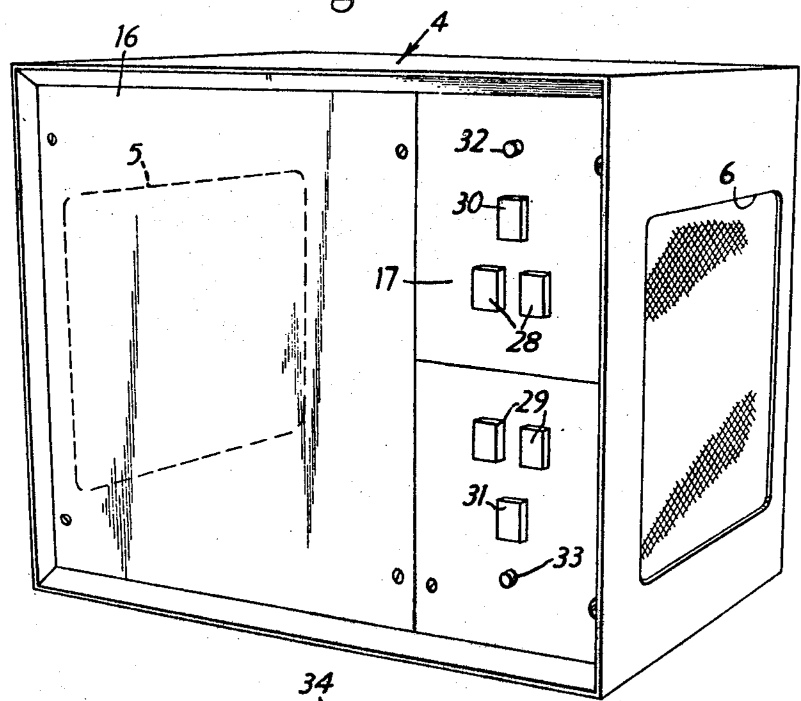
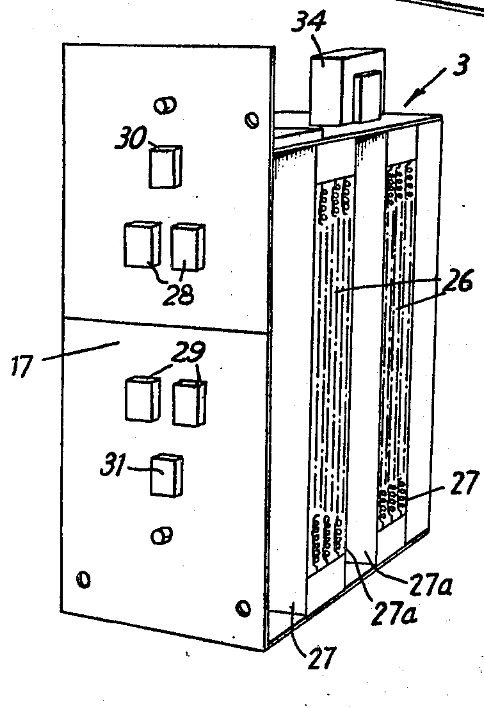
*Fig. 3.*

United States Patent Office 3,495,381
Patented Feb. 17, 1970

3,495,381

AIR FILTERING APPARATUS

Giulio Flanagan, Long Eaton, Nottingham, England, assignor to Gallone Engineering Company Limited, Mansfield, England, a British company

Continuation of application Ser. No. 648,902, June 26, 1967. This application Mar. 4, 1969, Ser. No. 806,023
Int. Cl. B03c *3/12, 3/02*
U.S. Cl. 55—129 4 Claims

ABSTRACT OF THE DISCLOSURE

As electrostatic gas filtering apparatus which may be portable, comprising an ionising and precipitator unit removably arranged in a casing in tandem with a tangential-flow fan unit.

This application is a continuation of my previous application Ser. No. 648,902, filed June 26, 1967, now abandoned.

The present invention relates to apparatus for the electro-static filtration of gas, for example air. In this type of apparatus the gas (hereinafter referred to simply as air), is impelled first through ionising means, where dust, smoke, or other particles therein are given an electro-static charge, and then through precipitating means which attracts the appropriately-charged particles and removes them from the air.

The size of filtering apparatus of the kind set forth is determined by the volume of air which it is intended to filter in a unit time, and hence by the rate of flow through the apparatus and the filtering efficiency. This in turn depends on the form of the filtering elements and of the means, for example a fan assembly, for impelling the air.

It is an object of this invention to provide a small, compact electro-static or filtering apparatus of the kind set forth which is efficient, economical to run, and easy to clean and maintain.

To this end the apparatus of the invention comprises an ionising and precipitating unit and a fan unit arranged in tandem in a common casing from which the ionising and precipitator unit is separately removable, said ionising and precipitator unit including an ionising section constituted by a bank of parallel and alternating oppositely-charged plates and wires, and a precipitating section comprised of a pack of alternately oppositely-charged parallel plates which are disposed to provide air flow channels at right angles to the length of the plates and wires of the ionising section, and said fan unit including at least one tangential flow fan arranged with its rotary axis and its air-impelling vanes parallel to the lengths of said air flow channels of said precipitator section.

By the term "tangential flow fan" is meant a cylindrical fan member which is adapted to direct the flow of air tangentially to its outer surface. Such fan provides a high rate of air flow in relation to its external dimensions.

Because of the facility provided to the apparatus according to the invention for separate removal of the ionising and precipitator sub-assembly as a unit from the remainder of the apparatus, the latter can be very readily and quickly cleaned and serviced. Moreover it provides a very compact yet efficient system. Maximum use is made of the air flow path through the ionising and precipitator unit, and the parallelism of the fan means and the air streams urging the latter makes for a smooth and efficient forwarding of the air.

As has already been indicated, the apparatus can be made small and compact. Thus it can be sufficiently small to be portable and carried about in the hand, if required, but will be efficient enough to provide an adequate rate of filtering of the air in a room of small size. It will be understood, however, that the apparatus can be permanently fixed in a utility position, for example on a wall or in ducting (in which case it may be used as an air conditioner), without detriment to the operation, maintenance and cleaning of the apparatus.

As a further contribution to the air flow efficiency of the apparatus, the fan unit may comprise two axially-parallel tangential flow fans and/or baffle means being provided between these fans and the precipitator section of the apparatus, these air baffle means being arranged so as to direct the air to the impelling vanes of the fans and to eliminate the turbulence which might otherwise occur at the threshold of the fans. This makes for very quiet running.

Advantageously the fan unit, which is a relatively more prominent fixture in the casing of the apparatus, will, in addition to the fan means, carry components of the electrical control system of the apparatus, including safety switch means operable in response to unfastening of the ionising and precipitator unit for removal thereof from the casing.

Thus the electrical system may include a main switch which is opened in response to the withdrawal of an element retaining the ionising and precipitator unit in the casing. This will safeguard the user against access to the electro-static unit when it is "live," and as a further safeguard the electrodes of the ionising and precipitator sections may be connected to a contact element with which a pivoted latch member is adapted to make earthing contact on release thereof by removal of a cover plate for the ionising and precipitator unit. This will ensure that the electrodes are fully discharged before the unit can be removed.

The fan unit may also incorporate means for heating the air impelled by the fan means, and indeed any other devices which may be required for conditioning the discharged air.

One form of air filtering apparatus in accordance with the present invention is illustrated in the accompanying drawings in which:

FIGURE 1 is a perspective illustration of the assembled apparatus,

FIGURE 3 is yet another perspective illustration showing the end of the fan unit opposite to that seen in FIGURE 2.

Figure 2:
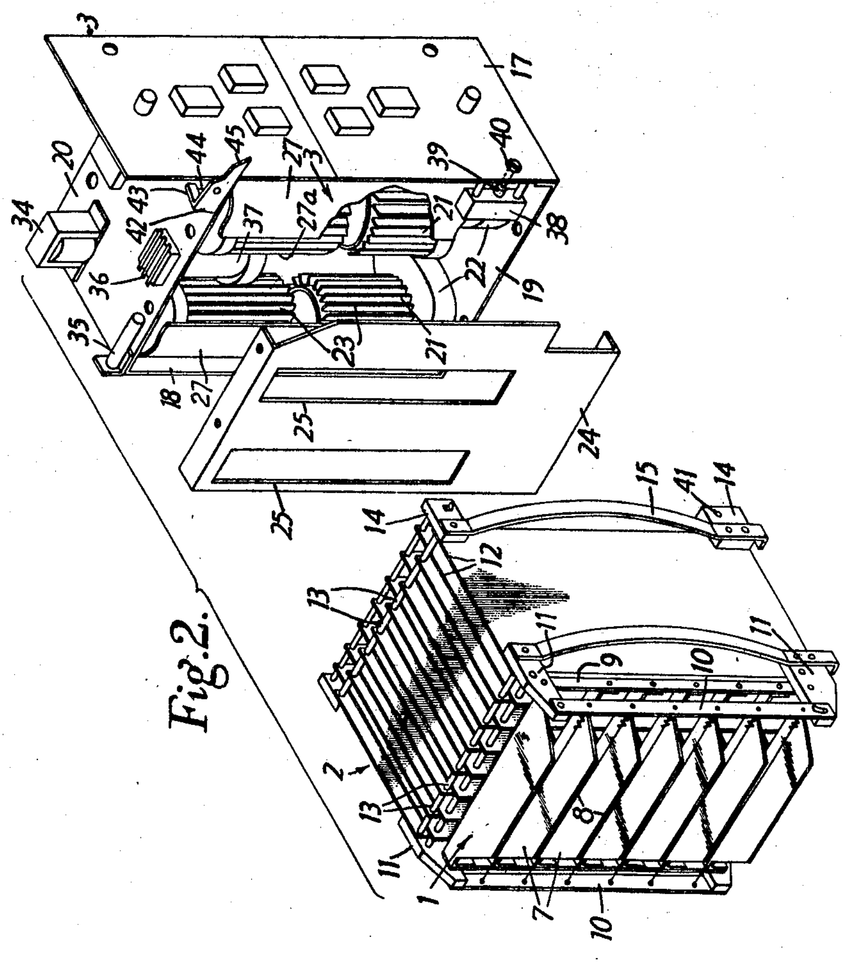
FIGURE 2 is an exploded perspective illustration showing the sub-assemblies in this apparatus.

Basically the equipment illustrated in the drawings comprises a separate ionising and precipitator unit, consisting of an ionising section 1 adjoined and secured to a precipitator section 2, and a fan unit 3, which also incorporates the controls of the apparatus. The ionising and precipitator unit 1, 2 is installed in tandem with the fan unit 3 in a common rectangular housing designated 4, the front and rear end walls of this housing being respectively furnished with a mesh-covered air inlet opening 5 and a similar cleaned air discharge opening 6.

The ionising section 1 is constituted by a set of vertically-spaced horizontal plates 7, and intervening wires 8 parallel to these plates. Plates 7 are attached to a pair of upright side strips 9 and wires 8 to similar strips 10, the strips 9 and 10 being bolted to support blocks 11 extending from the precipitator section 2.

This precipitator section comprises a pack of spaced vertical aluminium plates 12 which covers the complete width and depth of the ionising section 1. A pair of parallel support rods 13 is provided at each of the front and rear ends of the precipitator section and alternate plates 12 (which are to be oppositely charged) are carried by one or other of each pair of rods 13. Insulating sleeves serve as spacers on the rods between adjacent plates on the latter. The front rods 13 are secured in the blocks 11, whilst rear rods 13 are similarly engaged with corresponding blocks 14 at the rear of the unit.

Strap handles 15 are connected between blocks 11 and blocks 14 at one side of the unit and enable the latter to be quickly removed from the housing 4, for example for cleaning, and replaced. The housing is provided with a front panel 16 which is removable for this purpose.

The fan unit 3, which is more permanently installed in the housing 4, has a frame comprising a facia board 17 and a back panel 18 supporting between them a base plate 19 and a top plate 20. Disposed between the base plate 19 and top plate 20 are a pair of tangential flow fans 21 each mounted on a central shaft (not shown) which is vertically disposed and is driven by an electric motor 22 mounted on base plate 19. The vanes 23 of these fans are angled slightly from the radial direction and the two fans are arranged to be driven in opposite rotational directions.

Also incorporated in the assembled apparatus, between unit 1, 2 and unit 3 is a baffle plate 24 with vertical slots 25 to channel air to the respective fans 21. The area between the downstream side of the plates 12 and the two fans is defined as a fan inlet chamber. As is evident from FIGURE 2, the inlet openings to the fans are adjacent this chamber and are generally within view of each other and also of the downstream side of the plates 12. Hence, with the apparatus assembled and the fan motors switched on, air is drawn by fans 21 through inlet opening 5, through the ionising section 1 and the precipitator section 2, through the fan inlet chambers and eventually discharged through opening 6. It is directed into parallel vertical streams as it passes through the gaps between precipitator plates 12, and the baffle openings 25 provide for a smooth flow to the likewise-vertical impelling blades 23 of the fans, thus eliminating turbulence in the air flow at the threshold of these fans, and so catering for a smooth, efficient and noise-free working. Baffle 24 is also useful in inhibiting the penetration of deposited dust to the electrical controls of the apparatus (see below).

The plates 7 and wires 8 of the ionising section 1 are arranged to be oppositely changed to a high potential, for example 5000 volts, to provide electrodes which create a high intensity ionising field at this zone. The sets of alternate plates of the precipitator section are also oppositely charged, for example at 6000 volts. Thus during the passage of the air through ionising section 1, particles in the air are given either a positive or a negative electrostatic charge and, during the immediately-commencing, but relatively long passage thereof between plates 12, these charged particles are attracted by that of the two flanking plates which is at an opposite potential, and it is consequently deposited. In this way the air is cleaned by the time it reaches the fans 21 and is discharged from the apparatus through 6 in cleaned condition.

If desired, and as illustrated in FIGURE 3, the unit 3 may also incorporate a heating resistance element 26 in the air flow passage from the relevant fan 21 to discharge opening 6, and be guided over this by a baffle 27. One end of this baffle is shown in FIGURE 2 and the other end is shown in FIGURE 3. The other side of the air flow passage is defined by baffle **27*a* as shown in FIGURE 3 (one baffle 27*a*** being partially visible in FIGURE 2). The heating elements are fitted with self-resetting thermal cut-outs which isolate these elements in the event of their overheating due to the restriction of air flow for any reason, or short circuiting in the elements themselves, thus eliminating fire risk.

The controls for the apparatus are, as stated above, incorporated in fan unit 3. In the example illustrated it is assumed that the front panel 17 carries control switches 28 for the heaters 26 (wired so that the heaters cannot be switched on without the fans operating), control switches 29 for switching the charging supply to the plates 12 on or off, a lamp 30 in the heater control circuit to signal that the latter is operating, and fuses 32 and 33 respectively for the heater and plate circuits. In addition it has an amber neon indicator 31 which is wired into the electrical circuit of the precipitator plates 12 to signal the condition of these plates. As the plates become more contaminated by attracted dust, smoke, etc., the electrical system is so devised that the indicator light 31 becomes progressively brighter and flickers on and off repeatedly due to discharge across the shorting plates through the contaminated material. When the filter has attained maximum contamination, this indicator light remains permanently illuminated and glows at maximum intensity, signalling the need for removal and cleaning of the filter assembly.

Other electrical components which have been illustrated in the drawings as forming part of unit 3 comprise a high tension transformer 34 for charging the ionising electrodes and the precipitator plates, resistances 35 and 36, and a rectifier valve 37.

The fan unit further incorporates safety means to guard against accident when the apparatus is disassembled. To this end it will be noted that a switch box 38 is arranged at the lower part of the unit and has a boss 39 for receiving a screw 40 which is passed from the front of panel 17 through an aperture 41 in the lower block 14 of the precipitator section at the front of the apparatus to retain the unit 1, 2 assembled in the housing 4. When screw 40 is tightened up it operates a microswitch in box 38 controlling the main supply to the apparatus. Consequently, before the unit 1, 2 can be removed from the casing the screw 40 has to be undone and the electrical supply disconnected.

A further safety feature is the provision on to plate 20 of unit 3 of a pivoted latch 42, an offset tongue 43 of which cooperates with a pillar 44 connected to the electrodes of the ionising and precipitator sections. When the front panel 16 is in assembled position, it presses back the nose 45 of latch 42 and clears tongue 43 from pillar 44. When, however, the panel 16 is removed for withdrawal of the unit 1, 2, the tongue 43 automatically drops down into contact with pillar 44 and earths the electrodes 7, 8 and 12, so discharging any built-up electrostatic charge.

I claim:

1. An electrostatic air filtering apparatus comprising a casing having an inlet opening and a discharge opening, a set of ionizing electrodes mounted in the casing to receive air from the inlet opening and to impart an electrostatic charge to particles contained in the air entering the inlet, a set of precipitating electrodes in the form of a bank of generally parallel plates, said bank of plates defining generally parallel air flow channels between the plates from a first side thereof to a second side thereof said plates at said second side having a plurality of vertically extending parallel edges, said bank of plates arranged in the casing so that the air from the ionizing electrodes enters the bank of plates at the first side thereof, the plates thus collecting the particles which were given an electrostatic charge by the ionizing electrodes, and a gas-impelling means mounted in the casing between the second side of the bank of plates and the said discharge opening for receiving air from the said second side of the plates and impelling the air to the said discharge opening, said gas-impelling means comprising a pair of tangential flow fans each fan comprising a cylindrical member with a plurality of air-impelling vanes spaced thereabout, each of said fans having its axis and its blades extending substantially parallel to the said edges of the precipitating electrodes, the two fans being spaced from the second side of the plates and also spaced laterally from each other, the space defined by the said second side of the plates and the two fans defining a fan inlet chamber; a first baffle adjacent each fan and extending from a first end on the side of the fan facing the said second side of the plates in a direction away from the said chamber and around a part of the periphery of its respective fan and then away from the fan to a second end to form one side of an air flow passage from the fan to a discharge opening each fan also including a second baffle spaced from the said first baffle of its respective fan to further define said air flow passage of that fan, the part of each fan adjacent the first end of the first baffle opening into the said inlet chamber to define the inlet of opening of that fan such that said inlet openings are adjacent said inlet chamber, each inlet opening being within view of at least a part of the second side of the plates and the other fan such that air can flow from the second side of the plates to either fan, means for rotating the fans in opposite directions from each other to carry gas from said inlet openings, along the paths formed by said first baffles and then tangentially out said air flow passages to said discharge openings.

2. Apparatus according to claim 1, characterized by an electrical operating system including a main switch which is opened in response to the withdrawal of an element retaining the ionizing and precipitator sub-assembly in the casing.

3. Apparatus according to claim 1, characterized by the fact that the ionizing and precipitator electrodes are connected to a contact element with which a pivoted latch member is adapted to make earthing contact on release thereof by removal from the casing of a cover plate for the ionizing and precipitator sub-assembly.

4. An electrostatic air filtering apparatus as claimed in claim 1 wherein the ionizing electrodes comprise a bank of substantially parallel, oppositely charged electrodes which extend in a direction substantially perpendicular to the planes of the said generally parallel plates and are located immediately adjacent the said first side of the bank of plates, and wherein adjacent plates of the said bank of plates are oppositely charged.

References Cited

UNITED STATES PATENTS

| | | | |
|---|---|---|---|
| 2,521,605 | 9/1950 | Richardson | 55—143 |
| 2,780,305 | 12/1957 | Bonatz | 55—143 X |
| 2,873,000 | 2/1959 | Elam | 55—143 X |
| 2,925,881 | 2/1960 | Berly et al. | 55—145 |
| 3,140,935 | 7/1964 | Flagg | 55—139 |
| 3,149,937 | 9/1964 | Revell | 55—147 X |
| 3,150,816 | 9/1964 | Laing | 230—129 X |
| 3,232,522 | 2/1966 | Laing | 230—125 |
| 3,236,298 | 2/1966 | Laing. | |
| 3,339,902 | 9/1967 | Martin | 261—142 |
| 3,348,828 | 10/1967 | Laing | 261—142 |

FRANK W. LUTTER, Primary Examiner

D. E. TALBERT, Assistant Examiner

U.S. Cl. X.R.

55—138, 139, 145, 470, 267; 230—125